(12) United States Patent
Jung

(10) Patent No.: US 7,043,161 B2  
(45) Date of Patent: May 9, 2006

(54) OPTICAL COMMUNICATION INTERFACE MODULE CONNECTED TO ELECTRICAL COMMUNICATION INTERFACE MODULE OF I²C COMMUNICATION PROTOCOL

(75) Inventor: Won-Seok Jung, Suwon (KR)

(73) Assignee: Opticis Co., LTD, Seongnam (KR)

( * ) Notice: Subject to any disclaimer, the term of this patent is extended or adjusted under 35 U.S.C. 154(b) by 737 days.

(21) Appl. No.: 10/221,330

(22) PCT Filed: Mar. 9, 2001

(86) PCT No.: PCT/KR01/00366

§ 371 (c)(1),  
(2), (4) Date: Sep. 11, 2002

(87) PCT Pub. No.: WO01/69817

PCT Pub. Date: Sep. 20, 2001

(65) Prior Publication Data

US 2003/0053172 A1    Mar. 20, 2003

(30) Foreign Application Priority Data

Mar. 11, 2000  (KR) .............................. 2000/12318

(51) Int. Cl.  
    *H04B 10/12* (2006.01)
(52) U.S. Cl. ........................... 398/139; 398/141
(58) Field of Classification Search ............. 398/139, 398/141  
See application file for complete search history.

(56) References Cited

U.S. PATENT DOCUMENTS 5,069,522 A    12/1991  Block et al.  
6,081,362 A     6/2000  Hatakeyama et al.

FOREIGN PATENT DOCUMENTS

DE    19646628 A1    5/1998  
EP    0402813 A2    12/1990

*Primary Examiner*—Jason Chan  
*Assistant Examiner*—Thomas Sills  
(74) *Attorney, Agent, or Firm*—Rothwell, Figg, Ernst & Manbeck

(57) ABSTRACT

An optical communication interface module connected to a direct-current (DC) power terminal, an input/output (I/O) terminal and a ground terminal, to perform optical communication. The module includes a PNP transistor for transmission, a pull-up device, a photo generator device, a photoelectric converter, and first and second NPN transistors for reception. The PNP transmission transistor has its base connected to the I/O terminal and its collector connected to the ground terminal. The first transistor for reception with its collector connected to the anode of the photo generator device and its emitter connected to the ground terminal, has its base driven by output signals of the photoelectric converter. The second transistor for reception with its collector connected to the I/O terminal and its emitter connected to the ground terminal, has its base driven by an output signal of the photoelectric converter.

2 Claims, 3 Drawing Sheets

OPTICAL COMMUNICATION INTERFACE MODULE CONNECTED TO ELECTRICAL COMMUNICATION INTERFACE MODULE OF I²C COMMUNICATION PROTOCOL

BACKGROUND OF THE INVENTION

1. Field of the Invention

The present invention relates to an optical communication interface module connected to an electrical communication interface module of inter-integrated circuit (to be abbreviated as I²C hereinafter) communication protocol, and more particularly, to an optical communication interface module connected to a direct-current (DC) power terminal, an input/output (I/O) terminal and a ground terminal of an electric communication interface module of I²C communication protocol, to perform optical communication. Here, the I/O terminal refers to an I/O terminal to/from which a serial data signal or a serial clock signal of the I²C communication protocol is input/output.

2. Description of the Related Art

FIG. 1 shows waveforms for explaining an I²C communication protocol.

Referring to FIG. 1, the I²C communication protocol is a protocol for performing serial communication by only two channels for a serial data signal SDA and a serial clock signal SCL, without a channel for a control signal, unlike in a typical serial communication protocol. According to the I²C communication protocol, whenever the serial clock signal SCL becomes a logic state of '1' (a higher voltage level $V_H$), the state of the serial data signal SDA is set.

A time t1 at which the serial data signal SDA falls from a logic value of '1' to a logic value of '0' (a lower voltage level $V_L$), while the serial clock signal SCL has a logic value of '1', is a starting time of a data packet. A time t14 at which the serial data signal SDA rises from a logic value of '0' to a logic value of '1' while the serial clock signal SCL has a logic value of '1', is a terminating time of a data packet. Thus, in the time period of t1–t14 for a data packet, the serial data signal SDA must not undergo logic transition while the corresponding serial clock signal SCL.

Data having a logic value of '1', are sequentially transmitted or received for the duration of t2–t3 in which the serial clock signal SCL has a logic value of '1', data having a logic value of '0' for the duration of t4–t5, data having a logic value of '1' for the duration of t10–t11, and data having a logic value of '1' for the duration of t12–t13, respectively.

FIG. 2 shows general electric communication interface modules of I²C communication protocol, which are modules for a serial data signal SDA, and are the same as those for a serial clock signal SCL. In FIG. 2, reference mark SDA1$_{IN}$ denotes a serial data input signal supplied from a first module El1, SDA1$_{OUT}$ a serial data output signal supplied from the first module El1, SDA2$_{IN}$ a serial data input signal supplied from a second module El2, and SDA2$_{OUT}$ a serial data input signal supplied from the second module El2, respectively.

A procedure in which the serial data output signal SDA1$_{OUT}$ in the first module El1 is transmitted from the first module El1 and received at the second module El2, will now be described with reference to FIG. 2.

If the first serial output data SDA1$_{OUT}$ is at a logic '1' level, a first transistor $TR_1$ is turned ON. Accordingly, a current flows from a second power terminal Vcc2 of the second module El2 to a ground terminal via a pull-up resistor Rp$_2$, a second terminal P2, an electric current line CL, the first transistor $TR_1$ and a first current source $CS_1$.

Thus, the potential of a second terminal P2 is decreased, so that the second serial data input signal SDA2$_{IN}$ received through an inverter $B_2$ of the second module El2 becomes at a logic '1' level, that is, the current flows in a direction indicated by D1.

Conversely, if the first serial output data SDA1$_{OUT}$ is at a logic '0' level, the first transistor $TR_1$ is turned OFF. Accordingly, the potentials of the first and second terminals P1 and P2 are increased, so that the second serial data input signal SDA2$_{IN}$ received through the inverter $B_2$ of the second module El2 becomes at logic '0' level.

The above-described transmission/reception procedure is the same as a procedure in which the serial data output signal SDA2$_{OUT}$ in the second module El2 is transmitted from the second module El2 and received at the first module El1. The transmission/reception procedure of the serial clock signal SCL is also the same as described above.

According to the conventional electric communication interface module, the communication speed is reduced due to the internal resistance of the current line CL itself and the maximum communication path becomes shorter.

SUMMARY OF THE INVENTION

To solve the above problems, it is an objective of the present invention to provide an optical communication interface module, connected to an electric communication module of an I²C communication protocol to perform optical communication, thereby increasing the communication speed and the maximum communication path.

To accomplish the above object of the present invention, there is provided an optical communication interface module connected to a direct-current (DC) power terminal, an input/output (I/O) terminal and a ground terminal, to perform optical communication. The module includes a PNP transistor for transmission, a pull-up device, a photo generator device, a photoelectric converter, and first and second NPN transistors for reception. The PNP transmission transistor has its base connected to the I/O terminal and its collector connected to the ground terminal. The pull-up device with its one end connected to the DC power terminal, scales down the voltage in proportionate to the amount of the current flowing therein. The photo generator device with its anode connected to the opposite end of the pull-up device and its cathode connected to the emitter of the transmission transistor, generates light to be transmitted, according to the current flowing therein. The photoelectric converter converts the light received from the photo generator devices of the counter-party's optical communication module into an electrical signal. The first transistor for reception with its collector connected to the anode of the photo generator device and its emitter connected to the ground terminal, has its base driven by output signals of the photoelectric converter. The second transistor for reception with its collector connected to the I/O terminal and its emitter connected to the ground terminal, has its base driven by an output signal of the photoelectric converter.

According to the present invention, since the optical communication interface module is connected to the electric communication interface module of an I²C communication protocol to thus perform optical communication, the communication speed can be enhanced and the communication path can be increased as maximum as possible.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 2:
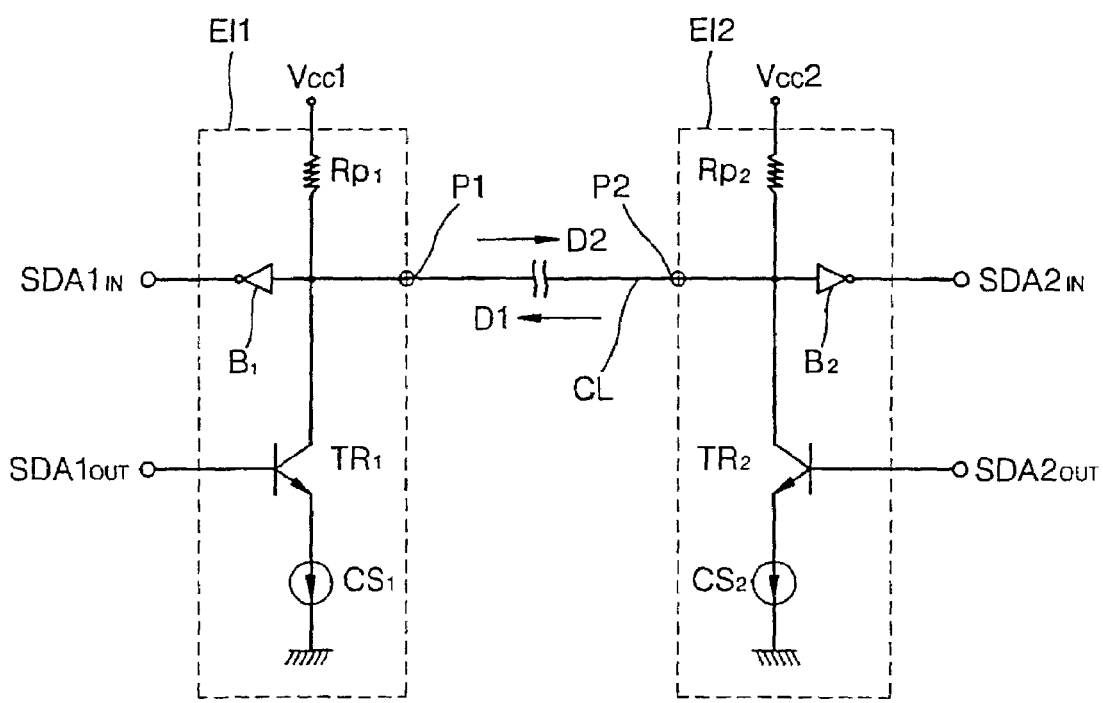
FIG. 2 is a circuit diagram of general electric communication interface modules of an I²C communication protocol.
Figure 3:
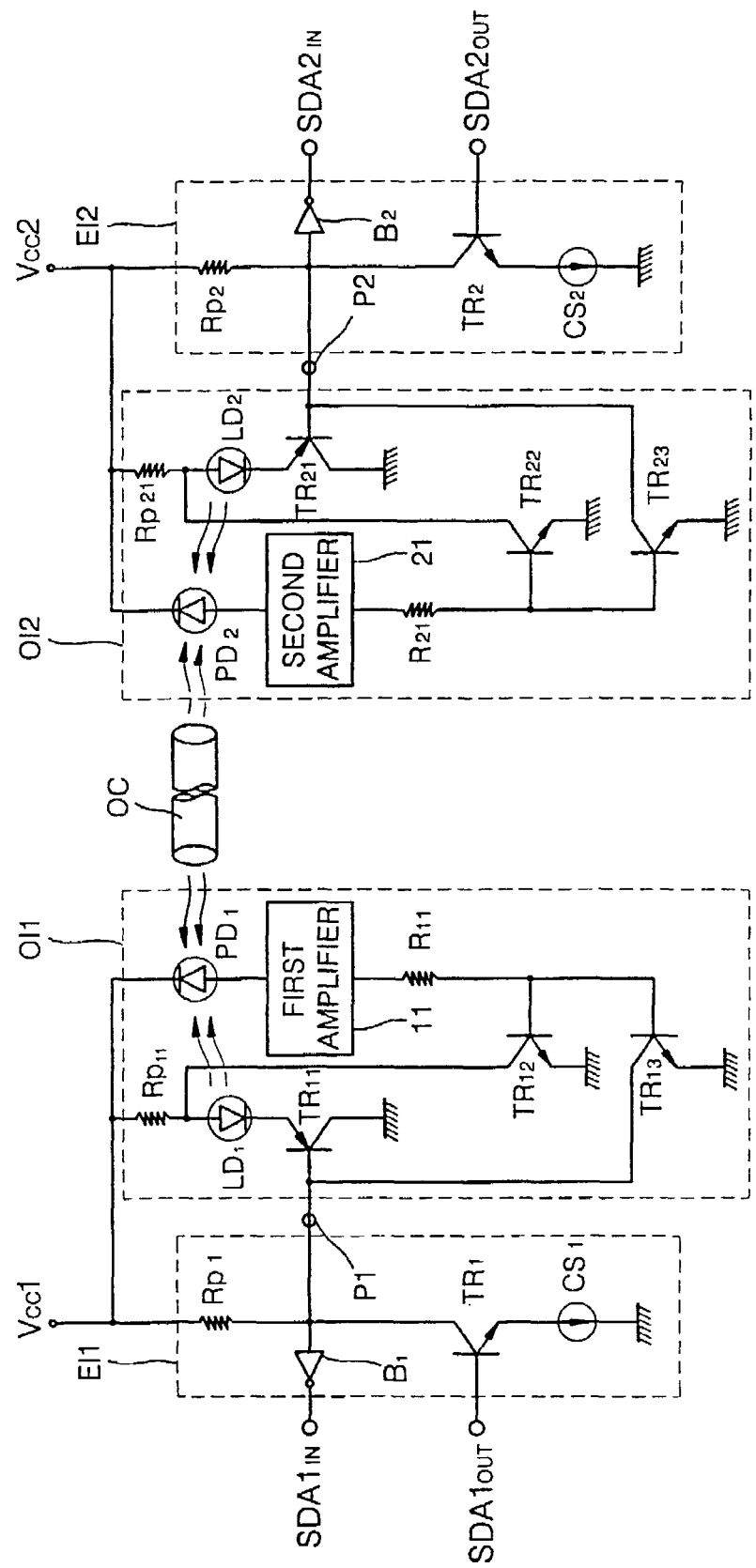
FIG. 3 is a circuit diagram illustrating the state in which optical communication modules according to the present invention are connected to the electric communication interface modules shown in FIG. 2.

FIG. 3 illustrates the state in which optical communication modules according to the present invention are connected to the electric communication interface modules shown in FIG. 2. In FIG. 3, the same reference marks as those in FIG. 2 denote the same functional elements. Optical communication interface modules Ol1 and Ol2 are for a serial data signal SDA, and are the same as those for a serial clock signal SCL.

Referring to FIG. 3, the optical communication interface modules Ol1 and Ol2 are modules, which are connected to DC power terminals Vcc1 and Vcc2, input/output (I/O) terminals P1 and P2 and ground terminals of the electric communication interface modules of I²C communication protocol, respectively, to perform optical communication. The respective modules Ol1 and Ol2 include PNP transistors $TR_{11}$ and $TR_{21}$ for transmission, pull-up devices $Rp_{11}$ and $Rp_{21}$, laser diodes $LD_1$ and $LD_2$ as photo generators, photo diodes $PD_1$ and $PD_2$ as photoelectric converters, first NPN transistors $TR_{12}$ and $TR_{22}$ for reception, and second NPN transistors $TR_{13}$ and $TR_{23}$ for reception.

The PNP transistors $TR_{11}$ and $TR_{21}$ for transmission with their bases connected to the I/O terminals P1 and P2 and their collectors connected to the ground terminals. The pull-up devices $Rp_{11}$ and $Rp_{21}$ having their one ends connected to the DC power terminals Vcc1 and Vcc2, scale down the voltages in proportionate to the amount of the current flowing therein. The laser diodes $LD_1$ and $LD_2$ with their anodes connected to the opposite ends of the pull-up devices $Rp_{11}$ and $Rp_{21}$ and their cathodes connected to emitters of the PNP transistors $TR_{11}$ and $TR_{21}$, generate light to be transmitted, according to the current flowing therein. The photo diodes $PD_1$ and $PD_2$ convert light received from the laser diodes $LD_1$ and $LD_2$ of the counter-party's optical communication module into electrical signals. The first NPN transistors $TR_{12}$ and $TR_{22}$ with their collectors connected to anodes of the laser diodes $LD_1$ and $LD_2$ and their emitters connected to the ground terminals, have their bases driven by output signals of the photo diodes $PD_1$ and $PD_2$. The second NPN transistors $TR_{13}$ and $TR_{23}$ with their collectors connected to the I/O terminals P1 and P2 and their emitters connected to the ground terminals, have their bases driven by output signals of the photo diodes $PD_1$ and $PD_2$.

The bases of the first NPN transistors $TR_{12}$ and $TR_{22}$ and the bases of the second NPN transistors $TR_{13}$ and $TR_{23}$ are commonly connected to each other to then be connected to one ends of resistors $R_{11}$ and $R_{21}$ for adjusting a current. The cathodes of the photo diodes $PD_1$ and $PD_2$ are connected to the DC power terminals Vcc1 and Vcc2, respectively, and the anodes thereof are connected the input terminals of first and second amplifiers 11 and 12, respectively. The first and second amplifiers 11 and 12 amplify the output signals of the photo diodes $PD_1$ and $PD_2$ with a predetermined amplification degree, and the amplified signals are applied to the bases of the first NPN transistors $TR_{12}$ and $TR_{22}$ and the second NPN transistors $TR_{13}$ and $TR_{23}$ via the resistors $R_{11}$ and $R_{21}$.

Now, a procedure in which the serial data output signal SDA1OUT in the first electric communication module El1 is transmitted from the first optical communication module Ol1 and then received at the second optical communication module Ol2 via an optical cable to then be input to the second electric communication module El2, will be described with reference to FIG. 3.

If the first serial output data SDA1OUT is at a logic '0' level, a first transistor $TR_1$ is turned OFF. Accordingly, the first PNP transistor $TR_{11}$ is turned OFF so that a current does not flow in the first laser diode $LD_1$, and no light is thus generated. Thus, the second photo diode $PD_2$ of the second optical communication interface module Ol2 are turned OFF, so that the first and second NPN transistors $TR_{22}$ and $TR_{23}$ of the second optical communication interface module Ol2 are turned OFF. Also, as the second NPN transistor $TR_{23}$ is turned OFF, a high voltage is applied to the terminal P2. Thus, the second serial data input signal SDA2IN received through the inverter $B_2$ of the second electric communication module El2 becomes at a logic '0' level.

Conversely, if the first serial output data SDA1OUT is at a logic '1' level, the first PNP transistor $TR_1$ is turned ON. Accordingly, the first PNP transistor $TR_{11}$ is turned ON so that a current flows in the first laser diode $LD_1$, and light is thus generated. The light emitted from the first laser diode $LD_1$ is transmitted through the optical cable OC so that the second photo diode $PD_2$ of the second optical communication interface module Ol2 is turned OFF. Accordingly, the current flows from the second DC power terminal Vcc2 to the bases of the first and second NPN transistors $TR_{22}$ and $TR_{23}$ via the second photo diode $PD_2$, the second amplifier 21 and the resistor $R_{21}$. Also, since the first and second NPN transistors $TR_{22}$ and $TR_{23}$ are turned ON, the current flows from the second DC power terminal Vcc2 to the ground terminal via the pull-up resistor $Rp_2$ of the second electric communication interface module El2, the terminal P2 and the second NPN transistor $TR_{23}$, and to the ground terminal via the pull-up resistor $Rp_{21}$ of the second optical communication interface module Ol2 and the second NON transistor $TR_{22}$, respectively. Accordingly, as a low voltage is applied to the terminal P2, the second serial data input signal SDA2IN received through the inverter $B_2$ of the second electric communication module El2 becomes at a logic '1' level.

Figure 1:
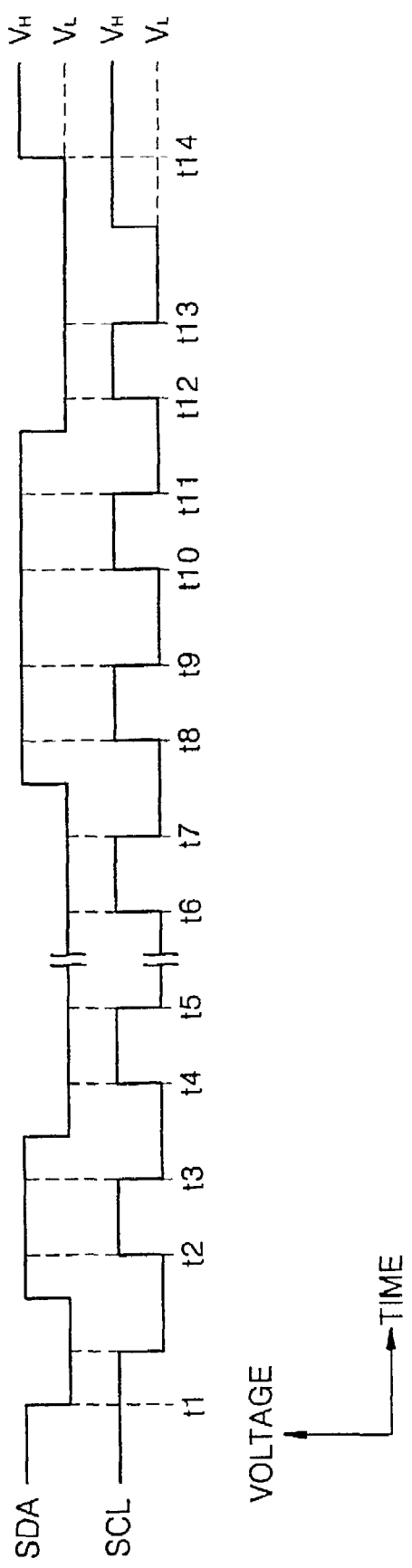
FIG. 1 is a timing diagram for explaining an I²C communication protocol.

The above-described transmission/reception procedure is the same as a procedure in which the serial data output signal SDA2OUT in the second module El2 is transmitted from the second optical communication interface module Ol2 and received at the first optical communication interface module Ol1. The transmission/reception procedure of the serial clock signal (SCL of FIG. 1) is also the same as described above.

The types of the transistors shown in FIG. 3, that is, NPN and PNP types, may be reversed according to the modification of enable logic and circuits.

According to the present invention, since the optical communication interface module is connected to the electric communication interface module of an I²C communication protocol to thus perform optical communication, the communication speed can be enhanced and the maximum communication path can be increased as much as possible.

What is claimed is:

1. An optical communication interface module connected to a direct-current (DC) power terminal, an input/output (I/O) terminal and a ground terminal, to perform optical communication, the module comprising:
   a transistor for transmission having its base connected to the I/O terminal and its collector connected to the ground terminal;
   a pull-up device having its one end connected to the DC power terminal, for scaling down the voltage in proportionate to the amount of the current flowing therein;
   a photo generator device with its anode connected to the opposite end of the pull-up device and its cathode connected to the emitter of the transmission transistor, for generating light to be transmitted, according to the current flowing therein;
   a photoelectric converter for converting the light received from the photo generator devices of the counter-party's optical communication module into an electrical signal;
   a first transistor for reception with its collector connected to the anode of the photo generator device and its emitter connected to the ground terminal, the first transistor having its base driven by output signals of the photoelectric converter; and
   a second transistor for reception with its collector connected to the I/O terminal and its emitter connected to the ground terminal, the second transistor having its base driven by an output signal of the photoelectric converter.

2. The optical communication interface module according to claim 1, wherein the bases of the first and second reception transistors are commonly connected to each other, and an amplifier for amplifying the output signal of the photoelectric converter with a predetermined amplification degree and applying the amplified signal to the bases of the first and second reception transistors, is provided between the common connection point of the bases of the first and second reception transistors and the photoelectric converter.

* * * * *